United States Patent [19]

Casale et al.

[11] Patent Number: 5,273,844

[45] Date of Patent: Dec. 28, 1993

[54] TERMINAL CONNECTOR FOR ELECTROCHEMICAL CELLS

[75] Inventors: Thomas J. Casale, Gainesville; Ronald C. Anderson, Alachua; Roger B. Britt, Gainesville, all of Fla.

[73] Assignee: Gates Energy Products, Inc., Gainesville, Fla.

[21] Appl. No.: 923,053

[22] Filed: Jul. 31, 1992

[51] Int. Cl.⁵ .............................................. H01M 8/10
[52] U.S. Cl. ................................... 429/178; 429/179; 429/12; 429/101
[58] Field of Search ............... 429/12, 178, 179, 101

[56] References Cited

U.S. PATENT DOCUMENTS 1,371,907  3/1921  Koretzky ............................ 429/14

*Primary Examiner*—Prince Willis, Jr.
*Assistant Examiner*—M. Nuzzolillo
*Attorney, Agent, or Firm*—Curtis H. Castleman, Jr.; H. W. Oberg; Steven G. Austin

[57] ABSTRACT

An electrical terminal connector is disclosed for use in an electrochemical cell. The terminal connector includes a first terminal member made from metal inert to the environment within said cell and adapted for interfacing internally within the cell. The first terminal member includes a socket portion communicating with the exterior of the cell. The terminal connector also includes a second terminal member made from low electrical resistance metal and is adapted for engagement within the socket portion from the exterior of the cell.

23 Claims, 1 Drawing Sheet

TERMINAL CONNECTOR FOR ELECTROCHEMICAL CELLS

BACKGROUND OF THE INVENTION

1. Field of the Invention

The present invention relates generally to electrochemical cells and, more particularly, to electrical terminal connections for such cells. Specifically, the present invention relates to an improved electrical terminal connection for electrochemical cells useful particularly in aerospace applications.

2. Description of the Prior Art

Electrochemical cells are available, in a wide variety of types, shapes and forms. In certain applications, electrochemical cells are encased within a sealed metal vessel. Such sealed vessels require electrical terminal connectors which pierce the vessel and provide terminal connection from the exterior of the containment vessel to the plate stacks contained therein. Examples of metal gas cells that utilize such terminal connectors are illustrated in U.S. Pat. No. 4,950,564 and U.S. Pat. No. 5,002,842, the contents of which are specifically incorporated herein by reference.

In many applications, the electrochemical cell electrolyte is relatively corrosive to certain metal components. Examples of such electrolyte systems include aqueous systems and alkaline electrolytes such potassium hydroxide (KOH). Previous hereto, one of the primary considerations for selecting a material and design for an electrical terminal is that it be inert to the chemical environment within the electrochemical cell. Consequently, electrical conductivity, weight and other factors were considered as secondary compared to the inertness factor. Unfortunately, such inert materials have tended to be somewhat heavy, and in certain instances such as in aerospace applications, weight is always an extremely critical factor. In other instances, the materials selected for use in the terminals were not necessarily the most electrically conductive compared to other available materials. This has been particularly true in nickel hydrogen secondary electrochemical cells for aerospace applications, as exemplified in the above-referenced patents. In such applications, high conductivity and light weight are critical factors, although the cell environment is also somewhat corrosive. Therefore, there remains a need for electrochemical electrical terminal connectors which can satisfy both inertness to the electrochemical cell environment as well as provide reduced weight and increased conductivity.

SUMMARY OF THE INVENTION

Accordingly, it is one object of the present invention to provide an improved terminal connector for electrochemical cells.

In another object of the present invention is to provide a terminal connector for secondary electrochemical cells which is inert to the cell environment yet provides high conductivity and low weight.

Yet another object of the present invention is to provide an electrical terminal connector for electrochemical cells which allows higher discharge currents while minimizing the weight of both the terminal as well as the terminal adapter.

To achieve the foregoing and other objects and in accordance with the purpose of the present invention, as embodied and broadly described herein, an electrical terminal connector is disclosed for use in an electrochemical cell. The terminal connector includes a first terminal portion made from metal inert to the environment within the cell and is adapted for interfacing internally within the cell. The first terminal portion also includes a socket portion communicating with the exterior of the cell. A second terminal portion is made from low electrical resistance metal and is adapted for engagement within the socket portion from the exterior of the cell.

BRIEF DESCRIPTION OF THE DRAWINGS

The accompanying drawings which are incorporated in and form a part of the specification illustrate preferred embodiments of the present invention, and together with a description, serve to explain the principles of the invention. In the drawings.

DETAILED DESCRIPTION OF THE PREFERRED EMBODIMENTS

Figure 1:
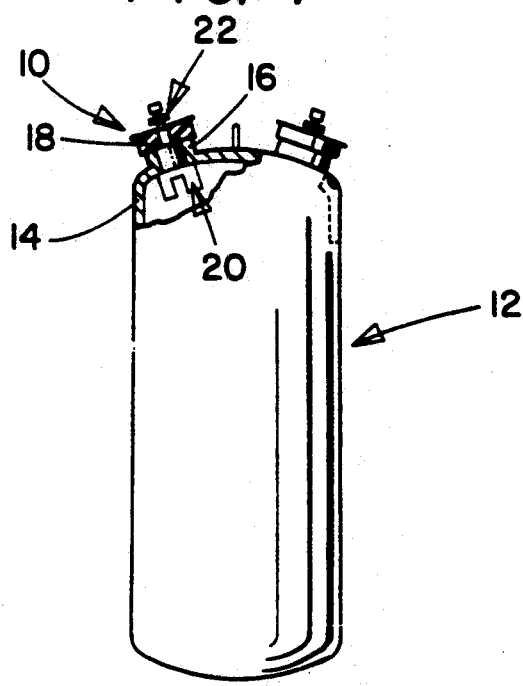
FIG. 1 is a side perspective view of a secondary electrochemical containment vessel, with some parts broken away, illustrating the terminal connection of the invention positioned therewithin.

Referring to FIG. 1, a dual resistance electrical terminal connector 10 is illustrated in position within a secondary electrochemical cell 12. The cell 12 includes a containment vessel 14 which, in the illustrated embodiment, is a sealed pressure vessel. The illustrated electrochemical cell 12 is typical of nickel hydrogen batteries having electrode plate stacks encased therewithin (not illustrated). Examples of such cells are illustrated in the above referenced patents. At the end of the pressure vessel 14, a boss 16 is provided through which the terminal connector 10 passes. An elastomeric grommet 18 may be provided at the exterior surface of the boss 16 to protect the connector 10 as well as assist in sealing.

Figure 2:
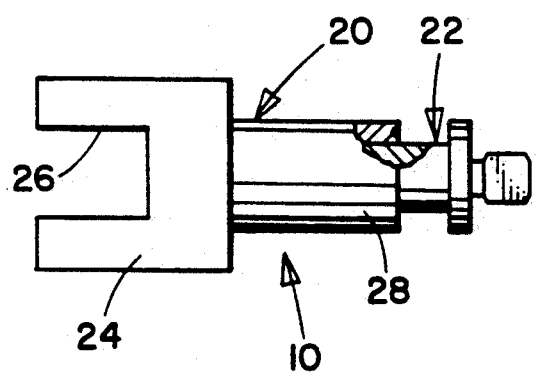
FIG. 2 is a side schematic view, with some parts broken away, of a terminal connection constructed in accordance with the present invention.
Figure 3:
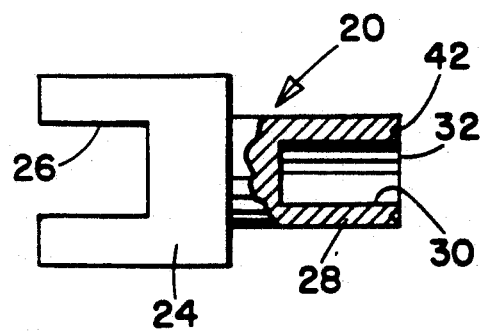
FIG. 3 is a side schematic view, with parts broken away, of the base portion of the terminal connection illustrated in FIG. 2.
Figure 4:
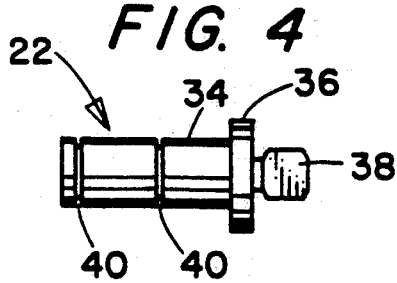
FIG. 4 is a side schematic view of the second terminal portion of the terminal connection constructed in accordance with the present invention.

Referring now in particular to FIGS. 2-4, the connector 10 preferably includes a first terminal portion 20 and a second terminal portion 22. The terminal connector 10 is bi-metallic having dual resistance in that the first and second terminal members 20 and 22 are each made from different metal materials.

The first terminal portion 20 is made from a material inert to the corrosive environment within the containment vessel 14. Typically, this environment may include an aqueous system having a alkaline electrolyte such as potassium hydroxide and the like. Moreover, in a nickel hydrogen cell, gaseous hydrogen under pressure is also present within the vessel 14. Thus, the first terminal portion 20, which is contained within the vessel 14, must be inert to that environment. Typically, material which may preferably be selected include nickel, silver, and gold, although nickel is the preferred material. The first terminal portion 20 includes a base portion 24 which is utilized for connection to the plate stack contained therewithin. This may include insertion of plate stack tabs (not illustrated) within the open connection area 26 of the base portion 24.

The first terminal portion 20 further includes an elongated, preferably cylindrical extension portion 28 which projects from the base portion 24 is adapted to pass through the boss 16 of the vessel 14. The tubular member 28 includes a cavity or socket 30 disposed in the end portion thereof which is open at its distal end 32. Thus, the socket 30 communicates with the exterior of the pressure vessel 14 when the base member 20 is positioned within the vessel 14 as illustrated in FIG. 1. The socket 30 is sized and shaped to snugly receive the second terminal portion 22 therewithin as described below.

The second terminal portion 22 is preferably in the form of a pin having an elongated cylinder portion 34 which is sized and shaped for a tight fit within the socket 30 of the first terminal portion 20. The second terminal portion 22 further includes an external flange 36 and a terminal connector member 38 which is designed to attach to electrical leads (not illustrated). As can be seen from FIG. 2, the cylinder portion 34 of the second terminal portion 22 is firmly inserted within the socket 30 of the first terminal portion 20.

The second terminal portion 22 is made from a metal different from that of the first terminal portion 20. The second terminal portion 22 is preferably made from a low resistance, high conductivity material in order to provide a high current carrying capability. Examples of such highly conductive materials include copper, silver, and gold metal. However, the preferred material is copper due to its high conductivity and relative inexpensiveness. Since the second terminal portion 22 is not in contact with the internal environment of the vessel 14, it is not necessary that it be inert to that environment as is the first terminal portion 20. Therefore, a highly conductive metal such as copper may be utilized, which if in contact with the environment of vessel 14, would be corroded very rapidly. In this manner, a bi-metallic terminal 10 is formed providing the necessary inertness for the portions of the terminal 10 in contact with the vessel environment yet providing a high current carrying capability due to high conductivity resulting from the second terminal portion 22.

The second terminal portion 22 may be attached to the first terminal tubular member 28 in any number of different ways. The preferred manner of the attachment includes brazing or soldering the second terminal pin 34 within the socket 30 of the first terminal portion 20. Any type of high conductivity braze may be used, although a braze consisting of 72% Ag-28% Cu is preferred.

To assist in the brazing technique, a pair of circumferential grooves 40 are preferably provided in the surface of the pin cylindrical portion 34. The grooves 40 are provided so that excess brazing material will flow therein rather than flow outside the distal end 32 of the cylinder 28. This is particularly important in order to ensure that sufficient brazing material is retained within the socket 30 to provide firm physical and electrical attachment of the second terminal portion 22 to the first terminal portion 20.

Figure 5:
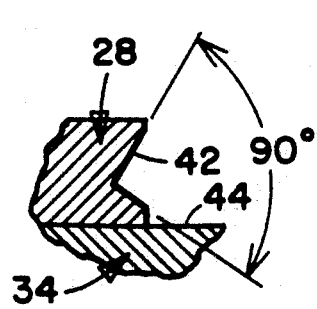
FIG. 5 is an enlarged schematic view of the broken away portion of FIG. 2 illustrating certain angular relationships of the parts thereof.

In addition, an annular groove 42 is provided in the distal end portion 32 of the tabular member 28 to provide a holding area for brazing material to interconnect the distal end portion 32 with the side of the pin cylindrical member 34. This is particularly illustrated in FIG. 5 wherein an enlarged groove 42 is shown cut at an optimum angle of 90° between the sides of the groove 42. When brazing occurs, braze material is melted into the groove 42 and overflowed up against the side 44 of the pin cylindrical portion 34. In this manner, the second terminal portion 22 is firmly secured both within the socket 30 as well as at the distal end of portion 32 of the tubular member 28. Moreover, electrical contact between the two terminal members 20 and 22 is assured. This firm attachment between the second terminal portion 22 and the first terminal portion 20 is extremely important in aerospace applications wherein the electrochemical cells 12 undergo severe shock during launch into space. Inadvertent physical or electrical detachment of the second terminal portion 22 from the first terminal portion 20 as a result of such severe physical vibration would make the electrochemical cell 12 inoperative, thereby perhaps defeating the entire launch mission and/or use of the satellite to which the electrochemical cell is attached. Therefore, firm attachment between the two terminal portions 20, 22 is of the utmost importance.

As previously discussed, the electrochemical cell 12 for which the terminal connector 10 is used may be of any desired type of secondary electrochemical cell. In particular, cells which benefit significantly by use of such terminal connectors are sealed cells such as nickel hydrogen, nickel cadmium, nickel metal hydride and silver-zinc cells. However, any type of electrochemical secondary cell may utilize the present invention, although cells having pressurized containment vessels with highly corrosive internal environments are particularly well suited for use with the bi-metallic electrical terminal connector of the present invention.

As can be seen from the above, the present invention provides an improved electrical terminal connector for electrochemical cells. The dual resistance or bi-metallic aspect of the terminal connector permits the connector to resist corrosive environments found within electrochemical cells yet provide high electric conductivity due to the bi-metallic design thereof. Consequently, the present invention provides a terminal connector that is highly useful in a wide variety of electrochemical cell applications yet remains highly conductive and capable of carrying high current. Moreover, the second terminal portion of the connector, due to its high conductivity, can be downsized in order to save weight with the electrochemical cell. This weight savings is particularly important in aerospace applications, yet it still provides high current discharge. The use of a lower resistance metal such as copper external to electrochemical cell allows the terminal connector to be smaller in size and cross sectional area and weight, while providing higher current carrying capabilities. Other advantages of the present invention include minimizing terminal adapter and boss modifications on electrochemical cell as well as redesigns, which ultimately saves weight and costs.

The foregoing description and the illustrative embodiments of the present invention have been shown in the drawings and described in detail in varying modifications and alternate embodiments. It should be understood, however, that the foregoing description of the invention is exemplary only, and that the scope of the invention is limited only to the claims as interpreted in view of the prior art.

What is claimed is:

1. A bi-metallic electrical terminal connector for use in an electrochemical cell, said terminal connector comprising a first terminal member made from a first metal inert to the environment within said cell and adapted for interfacing internally within said cell, said first terminal member including a socket portion communicating with the exterior of said cell, and a second terminal member made from a second low electrical resistance metal and adapted for engagement within said socket portion from the exterior of said cell.

2. The terminal connector as claimed in claim 1, wherein said electrochemical cell is selected from the group consisting of nickel hydrogen cells, nickel cadmium cells, nickel metal hydride cells, and silver-zinc cells.

3. The terminal connector as claimed in claim 2, wherein said electrochemical cell comprises a nickel hydrogen cell.

4. The terminal connector as claimed in claim 1, wherein said first terminal member is selected from the group consisting of nickel, silver and gold.

5. The terminal connector as claimed in claim 4, wherein said first terminal connector member comprises nickel.

6. The terminal connector as claimed in claim 1, wherein said second terminal connector is selected from the group consisting of copper, silver and gold metals.

7. The terminal connector as claimed in claim 6, wherein said second terminal connector member comprises copper.

8. The terminal connector as claimed in claim 1, wherein said first and second terminal connector members are made, respectively, from nickel and copper.

9. The terminal connector as claimed in claim 1, wherein said first terminal member includes a base portion secured within said cell and a substantially tubular member extending therefrom through said cell and communicating with the exterior of said cell, said tubular member defining said socket portion.

10. The terminal connector as claimed in claim 9, wherein the distal end of said tubular member includes a groove disposed in the end surface thereof for receiving brazing material therein to braze said second terminal member to said tubular member.

11. The terminal connector as claimed in claim 1, wherein said second terminal member includes an elongated pin member having a connector portion disposed at the end thereof, said elongated pin member being sized and shaped for insertion within said socket portion of said first terminal member.

12. The terminal connector as claimed in claim 11, wherein said elongated pin member includes a pair of circumferential grooves disposed in the surface thereof and adapted for retaining brazing material to prevent it from flowing out of said socket.

13. The terminal connector as claimed in claim 1, wherein said second terminal member is secured to said first terminal member by brazing.

14. A bi-metallic terminal for an electrochemical cell comprising a base member sized and shaped for positioning within said cell and defining a socket therein, an electrical connector sized and shaped for positioning exterior to said cell and insertable within said socket, and means for securing said electrical connector within said socket, said base member being constructed from a material substantially inert to the environment within said cell and said electrical connector being constructed from a highly conductive material.

15. The terminal as claimed in claim 14, wherein said base member comprises nickel and said electrical connector comprises copper.

16. The terminal as claimed in claim 14, wherein said base member includes an elongated tube defining said socket, said tube passing through the wall of said cell.

17. The terminal as claimed in claim 16, wherein said electrical connector comprises a pin member insertable within said socket.

18. The terminal as claimed in claim 17, wherein said securing means comprises metal brazing material interconnecting said base member and said electrical connector.

19. The terminal as claimed in claim 18, wherein said pin member comprises a pair of circumferential grooves disposed in the surface thereof for positioning within said socket, said grooves being adapted for receiving and retaining brazing material within said socket, and wherein said base member includes an elongated tube defining said socket, said tube having a groove disposed in the distal end thereof for enhancing the brazing of said pin to said base member.

20. In a nickel hydrogen electrochemical cell having a containment vessel and electrical terminals passing through the wall of said vessel, the improvement wherein each said terminal comprises a bi-metallic terminal connector having an interior portion made from an inert metal and an exterior portion made from low resistance, high conductivity metal, said interior portion having a socket communicating with the exterior of said vessel and adapted to receive said exterior terminal portion.

21. The improvement of claim 20, wherein said exterior terminal portion comprises a pin adapted for press-fitting within said socket.

22. The improvement of claim 20, wherein said external portion comprises a pin brazed within said socket.

23. The improvement of claim 22, wherein said pin includes a pair of grooves disposed on the circumferential surface thereof to prevent brazing material from flowing from said socket.

* * * * *